(12) United States Patent
Hancock et al.

(10) Patent No.: US 7,724,260 B2
(45) Date of Patent: May 25, 2010

(54) METHOD AND SYSTEM FOR IMAGE MONITORING

(75) Inventors: William R. Hancock, Phoenix, AZ (US); Jonathan P. Struebel, Desert Hills, AZ (US)

(73) Assignee: Honeywell International Inc., Morristown, NJ (US)

( * ) Notice: Subject to any disclaimer, the term of this patent is extended or adjusted under 35 U.S.C. 154(b) by 617 days.

(21) Appl. No.: 11/510,529

(22) Filed: Aug. 25, 2006

(65) Prior Publication Data

US 2008/0049028 A1   Feb. 28, 2008

(51) Int. Cl.
G09G 5/00 (2006.01)
G06F 15/16 (2006.01)
G01C 21/00 (2006.01)

(52) U.S. Cl. .............................. 345/502; 345/7; 340/971
(58) Field of Classification Search ................. 345/7–9, 345/502–503; 340/971
See application file for complete search history.

(56) References Cited

U.S. PATENT DOCUMENTS

| | | | | |
|---|---|---|---|---|
| 6,312,385 B1 * | 11/2001 | Mo et al. | ..................... | 600/443 |
| 7,012,553 B2 * | 3/2006 | Hedrick | ..................... | 340/971 |
| 2004/0046712 A1 | 3/2004 | Naimer et al. | | |
| 2004/0233210 A1 | 11/2004 | Hancock et al. | | |
| 2005/0276514 A1 | 12/2005 | Fisher | | |
| 2005/0286096 A1 * | 12/2005 | Yoon | ........................ | 358/483 |
| 2007/0139300 A1 * | 6/2007 | Salters et al. | ................. | 345/3.3 |

FOREIGN PATENT DOCUMENTS

| | | |
|---|---|---|
| DE | 10229342 A1 | 1/2004 |
| EP | 0609162 A2 | 8/1994 |
| WO | 02103292 A1 | 12/2002 |

OTHER PUBLICATIONS

Al-Asaad, H. et al., "Online Bist for Embedded Systems," IEEE Design & Test of Computers, Oct. 1, 1998, pp. 17-24, vol. 15, No. 4, IEEE Service Center, New York, NY, US.
European Search Report for Application No. 07114973.6, mailed on Jan. 23, 2009.

* cited by examiner

*Primary Examiner*—Xiao M Wu
*Assistant Examiner*—Tize Ma
(74) *Attorney, Agent, or Firm*—Ingrassia Fisher & Lorenz, P.C.

(57) ABSTRACT

A system for verifying the generation of a critical symbology includes a display processor configured to generate graphic commands from one or more system inputs. The display processor is further configured to determine the critical symbology. A graphics processing unit is coupled to the display processor. The graphics processing unit is configured to generate a plurality of pixels forming an image and is further configured to mark at least a portion of the plurality of pixels to produce marked pixels of the critical symbology. A graphics logic device is coupled to the graphics processing unit and includes an integrity monitoring function and a memory coupled to the integrity monitoring function. The integrity monitoring function is configured to detect the marked pixels and generate data regarding the critical symbology. The memory is configured to store the data regarding the critical symbology. A monitor warning function device is coupled to the graphics logic device and is configured to receive the data regarding the critical symbology and verify the generation of the critical symbology.

20 Claims, 9 Drawing Sheets

US 7,724,260 B2

METHOD AND SYSTEM FOR IMAGE MONITORING

FIELD OF THE INVENTION

The present invention relates to the field of video processing, and more particularly to a method and system for image monitoring.

BACKGROUND OF THE INVENTION

An operator of a system often relies upon visual indicators to show, among other things, the status of the system. For example, the operator of an aircraft can be provided with indicators such as a visual indicator of the horizon line of the aircraft, a visual indicator of the airspeed of the aircraft, and a visual indicator of the altitude of the aircraft. At one time these visual indicators were provided using analog, mechanical displays. Increasingly, electronic display panels, comprised of a number of individually addressable pixels, are being used to provide visual indicators of system status. Typically, to display the symbology that provides visual indicators, a graphics processing unit is used to generate the symbology, which is then displayed on a display. The proper generation of the symbology is needed to provide the operator an accurate indicator of system status.

Because of the importance of correctly displaying critical symbology, the data sent to the display is typically monitored to determine if the critical symbology was correctly rendered. In a typical prior art system, the display system includes a server that receives information regarding the images to be displayed from a processor, such as an airborne system and generates commands to produce images. The commands are received by a graphics processing unit, which uses the commands to generate the image to be displayed by determining the state of each pixel in the image based on the generated commands. The display receives the information regarding each pixel and sets each pixel in the display that comprises the image to the proper state.

In prior art systems, the data produced by the display processor and the data produced by the rendering engine can be checked. The display commands produced by the display processor from input data are received by a comparator circuit (or processor). The comparator circuit also receives the same input that the display processor uses to generate the display commands. Since in prior art systems the input data from the display commands can be extracted, the comparator circuit compares the data from the display processor with data that the comparator circuit calculated from the input. If there is a match, this part of the verification passes and the display processor is producing the correct commands from a given input.

In one prior art system, the display processor also inserts a sequence of test commands in the commands sent to the rendering engine. These commands generate test images in an extended area of the display that is not visible to the user. The display output of the rendering engine sent to the extended area of the display is sampled and a cyclic redundancy check (CRC) value is calculated from the sample data. The CRC value is then compared to an expected CRC value to determine if there is a failure in the rendering engine.

While the prior art systems were adequate for monitoring many display systems, an increasing reliance on commercial off the shelf (COTS) display chips has made the task of monitoring display systems more difficult and problematic. One reason is because the architecture of display systems, especially those based on COTS display chips, have undergone changes that render previous monitoring systems inadequate. For example, some COTS rendering engines include integrated circuits that may incorporate functions previously performed in the display processor. This change makes previous methods of monitoring display systems unusable, as it is impractical to extract the commands used to generate pixel data.

Accordingly, it is desired to provide a method and system for image monitoring. Furthermore, the desirable features and characteristics of the present invention will be apparent from the subsequent detailed description and the appended claims, taken in conjunction with the accompanying drawings and the foregoing technical field and background.

BRIEF SUMMARY OF THE INVENTION

In one embodiment of the present invention, a method for verifying the rendering of an image for a display system comprises a first step of generating a plurality of pixels that form the image. During this process, pixels of a critical symbology within the image are marked. Then, the plurality of pixels is sent to an integrity monitor. The marked pixels of the critical symbology and a location of the pixels of the critical symbology are retrieved from the plurality of pixels for use to verify the rendering of a graphic image. The marked pixels of the critical symbology and the location of the marked pixels of the critical symbology are saved to a memory.

In another embodiment of the present invention, a system for verifying the generation of a critical symbology includes a display processor configured to generate graphic commands from one or more system inputs. The display processor is further configured to determine the critical symbology. A graphics processing unit is coupled to the display processor. The graphics processing unit is configured to generate a plurality of pixels forming an image and is further configured to mark at least a portion of the plurality of pixels to produce marked pixels of the critical symbology. A graphics logic device is coupled to the graphics processing unit and includes an integrity monitoring function and a memory coupled to the integrity monitoring function. The integrity monitoring function is configured to detect the marked pixels and generate data regarding the critical symbology. The memory is configured to store the data regarding the critical symbology. A monitor warning function device is coupled to the graphics logic device and is configured to receive the data regarding the critical symbology and verify the generation of the critical symbology.

In another embodiment of the present invention, a system for verifying the generation of a critical symbology includes a display processor configured to generate graphic commands from one or more system inputs. The display processor is further configured to determine the critical symbology. A graphics processing unit is coupled to the display processor. The graphics processing unit is configured to generate a plurality of pixels forming an image and is further configured to mark at least a portion of the plurality of pixels to produce marked pixels of the critical symbology. A graphics logic device is coupled to the graphics processing unit and includes an integrity monitoring function and a memory coupled to the integrity monitoring function. The integrity monitoring function is configured to locate a first marked pixel, store a "1" at an initial location of a bitmap, locate additional marked pixels, for each marked pixel located, store a "1" in the bitmap, the "1" placement in the bitmap based on the "1" stored at the initial location and a offset between the first marked and the located marked pixel. The memory is configured to store the data regarding the critical symbology. A monitor warning function device is coupled to the graphics logic device and is configured to receive the data regarding the critical symbology and verify the generation of the critical symbology.

BRIEF DESCRIPTION OF THE DRAWINGS

The present invention will hereinafter be described in conjunction with the following drawing figures, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

An image monitoring method and system, in one exemplary embodiment of the present invention, retrieves pixels associated with critical symbologies such as a horizon line on an aircraft display, an alphanumeric representation of air speed and altitude, and the like, generated by a graphics processing unit. The pixels associated with the critical symbology are marked to allow retrieval by a graphics logic device. The pixels received at the graphics logic device can then be sent to a monitor warning function device where the symbology represented by the captured pixels can be matched to a template or correlated with a template to verify the accuracy of generated pixels.

Figure 1:
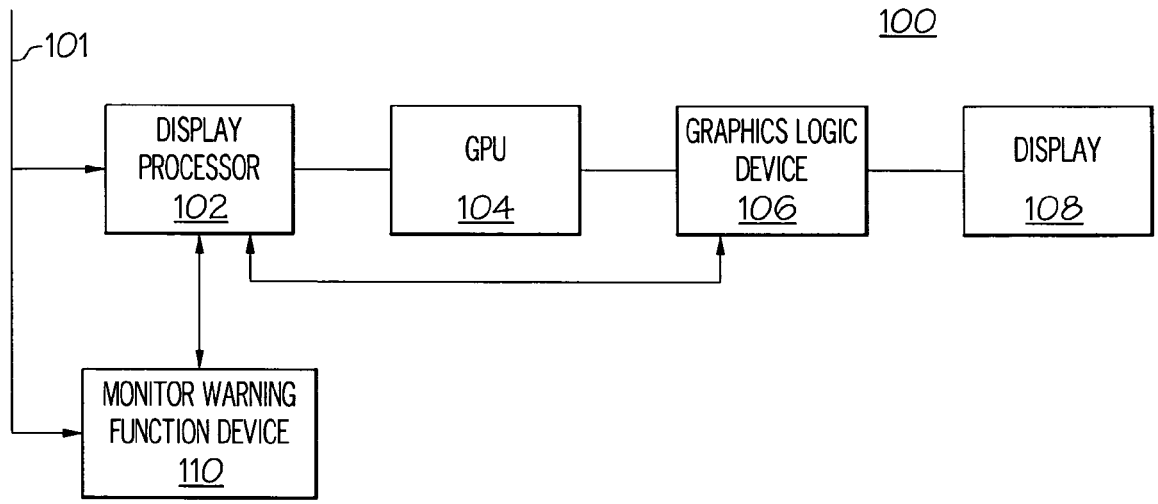
FIG. 1 illustrates an exemplary embodiment of a monitored display system in accordance with the teachings of the present invention.

FIG. 1 illustrates an exemplary embodiment of a monitored display system 100 in accordance with the teachings of the present invention. Monitored display system 100 includes a display processor 102 coupled to a graphics processing unit (GPU) 104. The GPU 104 is coupled to a graphics logic device 106 that couples to a display unit 108. A monitor warning function device 110 is coupled to the graphics logic device 106 via the display processor 102. A system bus 101 couples the display processor 102 and the monitor warning function device 110.

Display processor 102 receives data from other systems to generate graphics commands for the GPU 104. The display processor 102 generates data in world coordinates, which are Cartesian coordinates using actual measurement units, as opposed to pixel coordinates, which are used as a coordinate system referenced to the display unit 108. In one embodiment, the input to the display processor 102 can be data such as a commanded change in an airplane's pitch or roll received over the system bus 101. This data can then be used to generate commands for the GPU 104. A myriad of other system data can also be supplied to the display processor 102.

In one exemplary embodiment, the display processor 102 identifies one or more critical symbologies to be checked by the monitored display system 100. Critical symbologies can be any graphical symbol, including lines and curves, or alphanumeric character that can be displayed on the display unit 108. The graphical symbols and alphanumeric characters are considered to be critical symbologies because of the importance of correctly displaying the symbols and characters. The display processor 102 can send data to the GPU 104 indicative of the identity of the critical symbology to be monitored such that the pixels belonging to the critical symbology can be marked. This will be discussed in greater detail below. The critical symbology can be selected from a stored list of critical symbology that can be checked by the monitored display system 100. In one exemplary embodiment, when there are multiple display windows on a display unit 108, one or more critical symbologies per display window can be selected. In one exemplary embodiment, multiple critical symbols in a single window can be detected by marking one critical symbol per the update of the display and then sequencing through each of the critical symbols in subsequent updates to the display.

Figure 2:
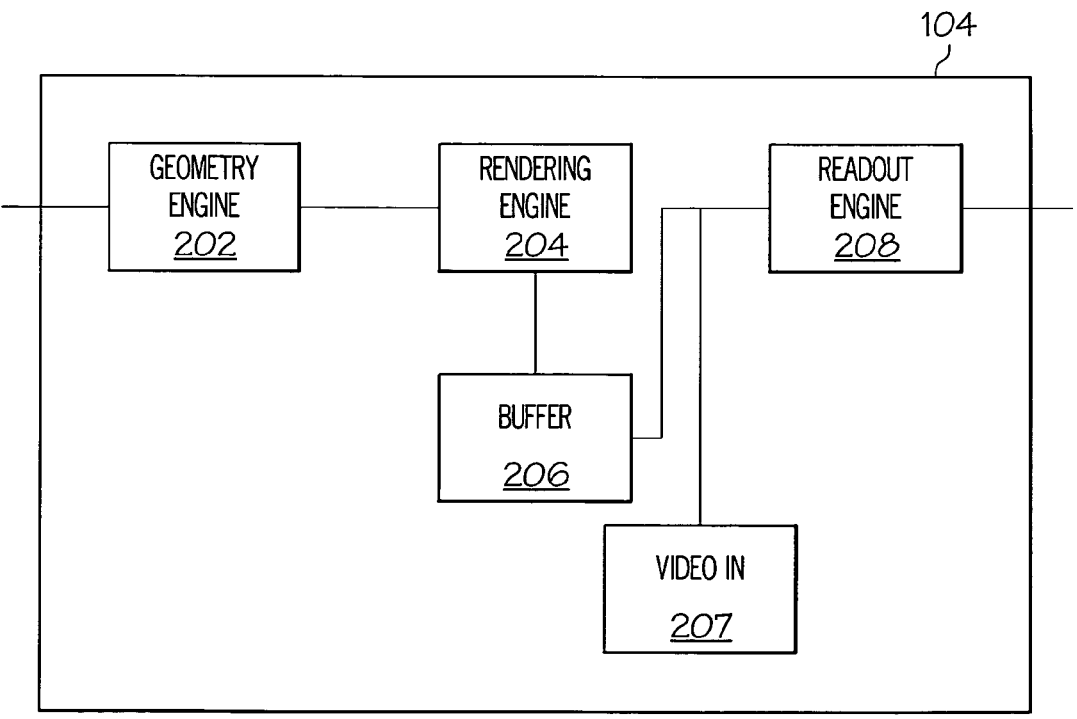
FIG. 2 illustrates an exemplary embodiment of a graphics processing unit in accordance with the teachings of the present invention.

GPU 104 receives commands from display processor 102 and generates pixel values, typically comprising red, green, and blue color intensity values, an alpha value denoting opacity, and pixel location coordinates denoting location of the pixels with respect to a display unit. In an exemplary embodiment, GPU 104, as illustrated in FIG. 2, comprises a geometry engine 202 coupled to a rendering engine 204. The rendering engine 204 is coupled to a pixel buffer 206. The pixel buffer 206 is coupled to a readout engine 208. A video input 207 is coupled to the readout engine 208.

Geometry engine 202 receives commands from the display processor 102 and performs any necessary rotation, translation or other geometrical and spatial manipulation of the data. The rendering engine 204 receives the output of the geometry engine 202 and performs the calculations necessary to generate pixel values and pixel location coordinates for each pixel in the image to be displayed on the display unit 108. In one exemplary embodiment, a pixel value may comprise 8 bits of red value, 8 bits of blue value, 8 bits of green value and 8 bits of an opacity value. The pixel values for each pixel can be saved to pixel buffer 206. The readout engine 208 can read the pixel values stored in the pixel buffer 206 for presentation to the graphics logic device 106.

In one exemplary embodiment, the GPU 104 marks the pixels of the critical symbologies such that they can be retrieved by the graphics logic device 106 for monitoring purposes. In one exemplary embodiment, the pixels of the critical symbologies are marked by setting the least significant bit of at least one of the color values to a "1" value and all of the least significant bits of that color to "0" for all pixels that are not part of the critical symbology. In another exemplary embodiment, the polarity of the least significant bit can be reversed such that the least significant bit can also be set to a "0" with all other pixels having their least significant bit value set to a "1" value. Additionally, a bit other than the least significant bit can be chosen to be the monitored bit.

Figure 3:
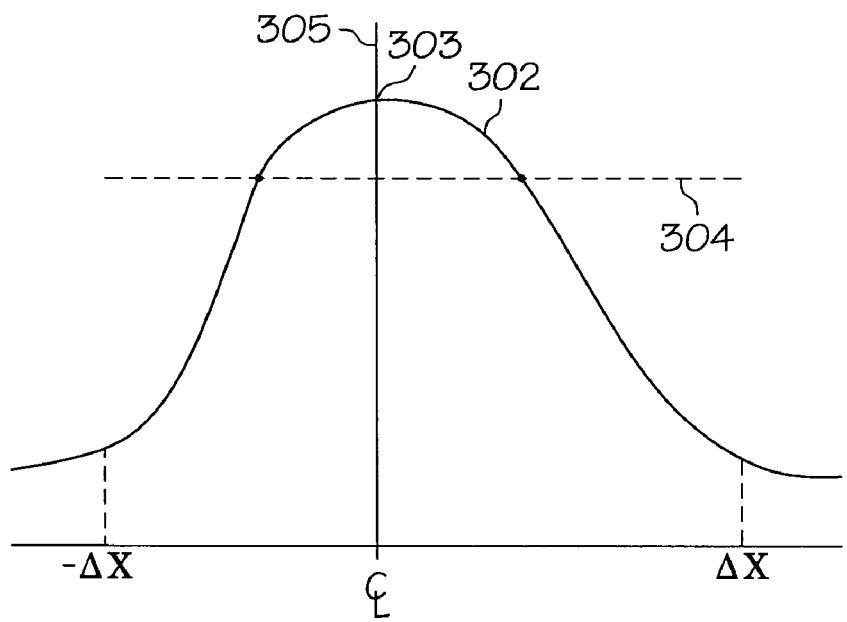
FIG. 3 illustrates an exemplary intensity profile used for generating symbologies in accordance with the teachings of the present invention.

In order to verify that critical symbology has been correctly rendered, it is not necessary to mark all pixels for the symbol. For example, not every pixel in a line needs to be marked in order to retrieve a representation of the line that can be used in the monitoring process. In a typical embodiment, to generate a line, character, or other shape for display on the display unit 108, a texture is applied to the shape using the rendering engine 204. An exemplary intensity profile 302 representing a texture is illustrated in FIG. 3. The intensity profile 302 includes a peak 303 at a center line 305 of the profile 302. The intensity values drop off on either side of the centerline 305. The intensity profile 302 can be applied to a shape, character or line such that the intensity profile represent a peak intensity profile at the center of the symbology with the intensity decreasing according to the intensity profile 302. This particular anti-aliasing scheme is representative of the current embodiment. This invention can also be used with other anti-aliasing mechanisms, such as area coverage, multi-sampling, or with no anti-aliasing mechanism.

Figure 4:
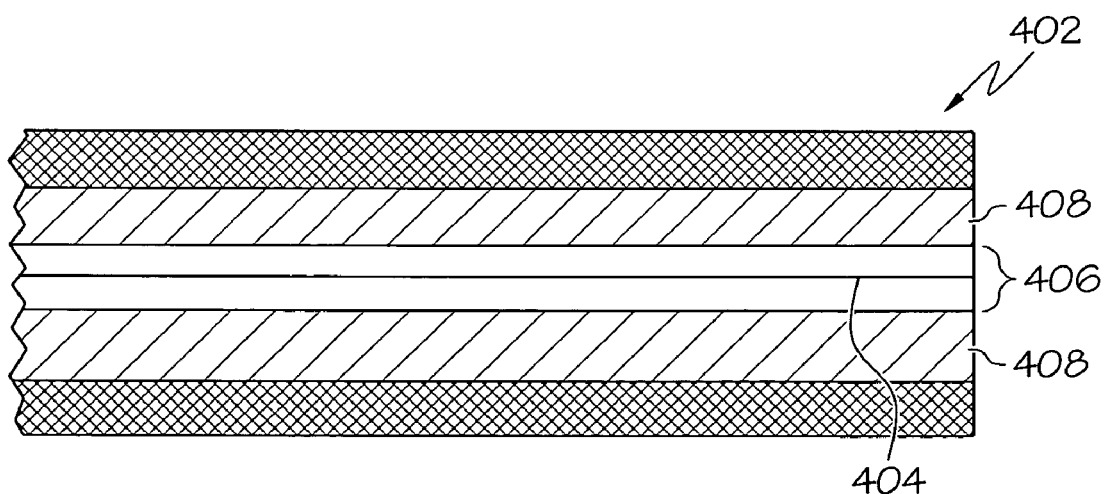
FIG. 4 illustrates an exemplary embodiment of a line to which an intensity profile can be applied in accordance with the teachings of the present invention.

FIG. 4 illustrates a line 402 to which the intensity profile 302 has been applied. The line 402 includes a center line 404, which has the highest intensity value of the line 402 according to the intensity profile 302. In the embodiment of FIG. 4, the centerline 404 bisects the most intense pixel value 406. Adjacent to the most intense pixel 404 are pixels of less intense intensity values 408. The intensity in the line 402 decreases as the distance from the center line 404 increases.

In order to mark the pixels to form a representation of the line, the pixel values for one or more colors are set for pixels along the center line 404 of line 402. This can be done, in one exemplary embodiment, by setting the least significant bit of one or more pixel color values to a "1" (depending on the embodiment of the present invention the least significant bit can be set to a "0" for pixels of the symbol) for all pixels above an intensity threshold 304 on the intensity curve 302 in FIG. 3. This marks all pixels along the center line 404, or highest intensity portion of the symbol. All pixels, both marked and unmarked, can be stored in the pixel buffer 206 for retrieval by the readout engine 208 of the GPU 104 for transmission to the graphics logic device 106. Patent application Ser. No. 10/851,972, entitled "Texture Based Method And System For The Anti-Aliasing Of Lines And Characters" by Hancock et al. discloses a method for applying intensity profiles to form texture lines, and is hereby incorporated by reference.

Video input 207 can receive video, such as video from a video camera mounted on an aircraft that shows the status of an aircraft component, and prepare the video for merging with graphical or alphanumeric characters produced by the rendering engine 204.

Figure 5:
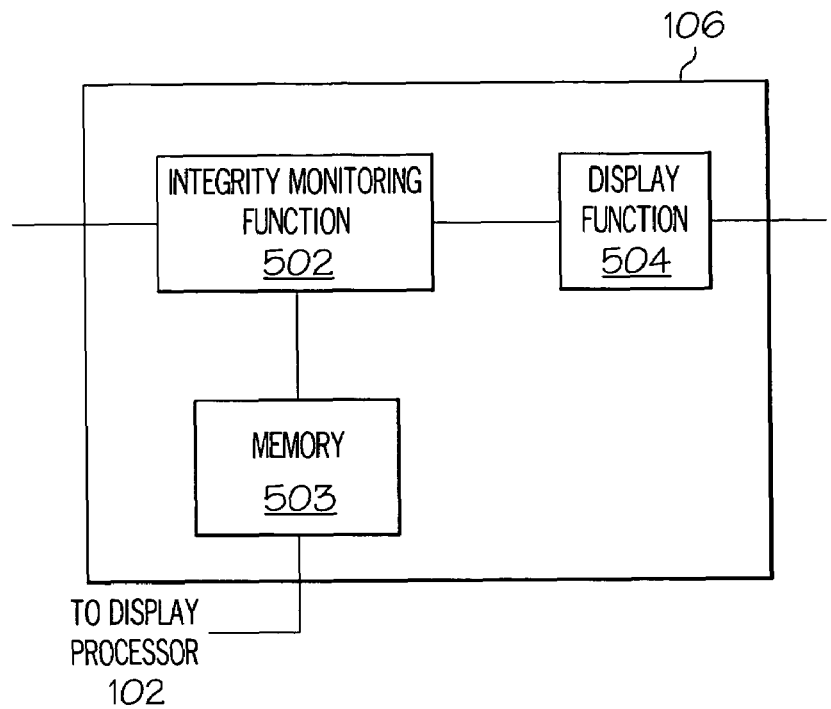
FIG. 5 illustrates an exemplary embodiment of a graphics logic device in accordance with the teachings of the present invention.

Graphics logic device 106 receives pixels sent via readout engine 208 and, as pixels are received, detects the marked pixels for storage and presentation to the monitor warning function device 110. Graphics logic device 106, in one embodiment, as illustrated in FIG. 5, comprises an integrity monitoring function 502 coupled to a display function 504. A logic device memory 503 is coupled to the integrity monitoring function 502.

The integrity monitoring function 502 checks each pixel for the marked bits and stores all of the marked pixels and/or data regarding the marked pixels in logic device memory 503. The marked pixels can be read out from the logic device memory 503 and transmitted to the display processor 102, which can send the data to the monitor warning function device 110.

Display function 504 performs all processing necessary to prepare the pixels rendered at rendering engine 204 for presentation to the display unit 108. For example, display function 504 can format the pixels such that pixels can be sent over a fibre channel connection between the graphics logic device 106 and the display unit 108.

Logic device memory 503, in one embodiment, can store all data associated with marked pixels such as the location of the marked pixels relative to the display screen, a character map of a detected character, and the like.

Turning back to FIG. 1, display unit 108 receives image data sent from the graphics logic device 106 to produce an image. Display unit 108 can be any pixel based display, such as cathode ray tube displays and LCD displays. Exemplary displays are manufactured by Honeywell, Inc.

Monitor warning function device 110 receives data representative of the pixels of the critical symbology and verifies the critical symbology was accurately generated. In one embodiment, the data representative of the critical symbology can be compared to templates stored at the monitor warning function device 110. The monitor warning function device 110 can receive the same inputs as display processor 102 via the system bus 101 and can independently determine what the critical symbology should be. The independently determined critical symbology can be used to select a proper template, generate a template, or directly used to compare with the data representative of the critical symbology as detected by the graphics logic device 106.

In one exemplary embodiment, a correlation between the critical symbology detected from the pixels generated by the rendering engine 204 and a template of what should be the critical symbology can be calculated to determine if there is a match. A method and system for determining a correlation between critical symbology and a template is disclosed in U.S. patent application Ser. No. 10/868,438, entitled "Image Monitoring Method and System," which is hereby incorporated by reference.

As discussed previously, the marked pixels and other information regarding the critical symbology is detected at the graphics logic device 106. Data concerning the critical symbology, such as the marked pixels, the location of the critical symbology as referenced to the display unit 108, a representation of the alphanumeric characters of the critical symbology and the like can be stored to the logic device memory 503. As discussed previously, critical symbology can be geometric symbols, such as a horizontal line on an aircraft display, or alphanumeric characters, such as airspeed of an aircraft. The critical symbology can comprise multiple characters which can be alphanumeric characters or graphical characters. In one exemplary embodiment, the detection, storage, and sending of graphical critical symbology differs from the detection, storage, and sending of alphanumeric critical symbology.

For graphical critical symbology, in one exemplary embodiment, data representative of all the marked pixels is stored to a memory such as logic device memory 503. For example, in the case of a line, the location on the display (screen location) for every marked pixel in the line is stored to the logic device memory 503. In one exemplary embodiment, the graphics logic device 106 sends pixel locations for a first end point of the line and a second end point of the line, a pixel value for the midpoint of the line, and a pixel value for the part between the first endpoint of the line and the midpoint of the line (the point at one-fourth of the line) and the point between the midpoint of the line and the second endpoint of the line (the point at three-fourths of the line) to the monitor warning function device 110. The data sent by the graphics logic device 106 can be compared to pixel locations of an independently generated graphical critical symbology rendered at the monitor warning function device 110 for verification of the accuracy of the rendering of the critical symbology in the GPU 104. The number of pixels returned can be varied from 1 to as many as desired. One pixel can be used only to detect translation or fixed rotation, while two pixels can be used to detect translation and rotation, and more than two pixels can be used to detect shape. Any other compression technique can be used to reduce the volume of data, such as an endpoint with the slope and length rather than two endpoints. In an alternative embodiment, the critical symbology can be verified in another manner.

In one exemplary embodiment, the critical alphanumeric symbology displayed on the display unit 108 or in a specific window of a display unit 108 is first located. As discussed previously, the pixels of the critical alphanumeric symbology are marked by setting the value of the least significant bit to a value ("0" or "1") and setting the least significant bit of all other pixels for the display to a different value. In an exemplary embodiment, the integrity monitoring function 502 checks all pixels for a marked pixel, scanning from left to right on the display unit 108 or in a display window. As the marked pixels are found, they are saved to a buffer. In an exemplary embodiment, the buffer is a 128 by 128 bit map designed to store a maximum of ten alphanumeric characters (arranged, in an exemplary embodiment, as two rows of five locations).

Figure 6:
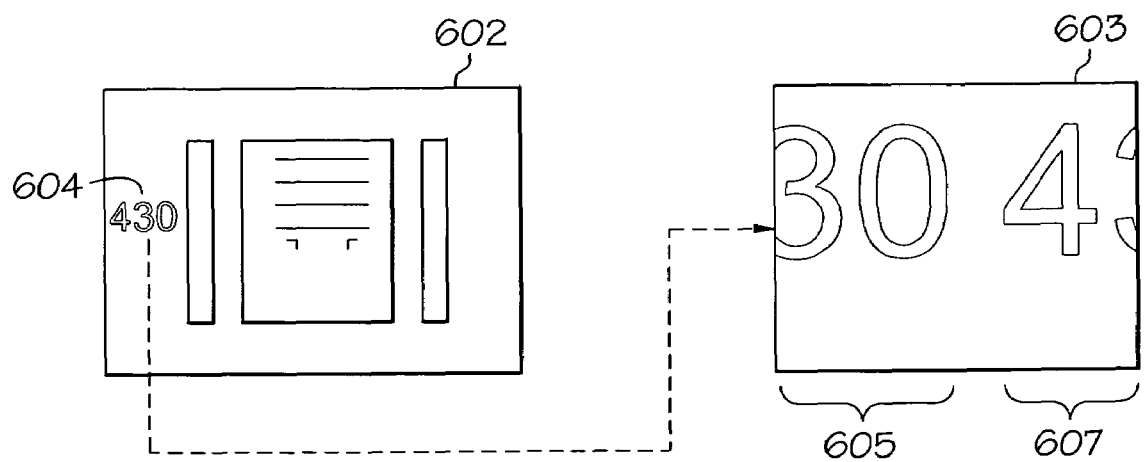
FIG. 6 illustrates an exemplary embodiment of an image on a display unit and a bit map stored in memory of the graphics logic device in accordance with the teachings of the present invention.

FIG. 6 illustrates an exemplary image 602 of a display unit 108 and a bit map 603 stored in memory of the graphics logic device 106, such as logic device memory 503. Display unit 108 displays an image 602 that indicates a current airspeed 604 of an aircraft. In the example of FIG. 6, the current airspeed 604 is 430 knots and is the critical symbology to be detected. Assuming that the top center portion of the "3" in FIG. 6 is slightly taller than the lead digit "4", when the integrity monitoring function 502 checks pixels from left to right and from top to bottom of the display, the top center of the "3" is the first part of the critical symbology detected. At this point, the integrity monitor 502 knows only the location of the first marked pixel. What is not known is if the first marked pixel is a character at the beginning of the alphanumeric string. In this case, the first marked pixel detected is not the beginning of the character string. In order to ensure that all detected characters are placed in the bit map 603 without prior knowledge of how many characters could be to the left of the first detected character, the placement of the detected pixels in the bit map 603 is divided between placing detected pixels in a right hand side 607 of the bit map 603 (which can be thought of as negative column positions) and a left hand side 605 of the bit map 603 (which can be thought of as positive column positions).

In one embodiment, the first detected pixel is placed at row 0, column 0 of the bit map. Then, all pixel values in columns to the right of the first detected pixel will correspond to a pixel in the left hand side 605 of the bit map 603. The pixels in any columns that are to the left of the first detected pixel will be mapped to the right hand side 607 of the bit map 603. As seen in the bit map 603 of FIG. 6, the airspeed of 430 is stored as 304. Since the first marked pixel is the center of the "3", part of the "3" and "0" are saved to the left hand side 605 of the bit map 603 and the character "4" and the rest of the "3" are saved to the right hand side 607 of the bit map 603. Thus, in the bit map 603, the actual first character in the string of critical alphanumeric symbology is not the first character in the bit map 603 and is not a full character, but instead is the character with the greatest negative distance from the position of the first detected character, where negative distance is distance to the left of the starting position.

Once all of the marked pixels are detected and the bit map 603 has been populated, each individual character can be extracted from the bit map 603. Optionally, the characters can be compressed before sending to the monitor warning function device 110 to determine if the detected characters were correctly generated at the correct location.

Figure 7:
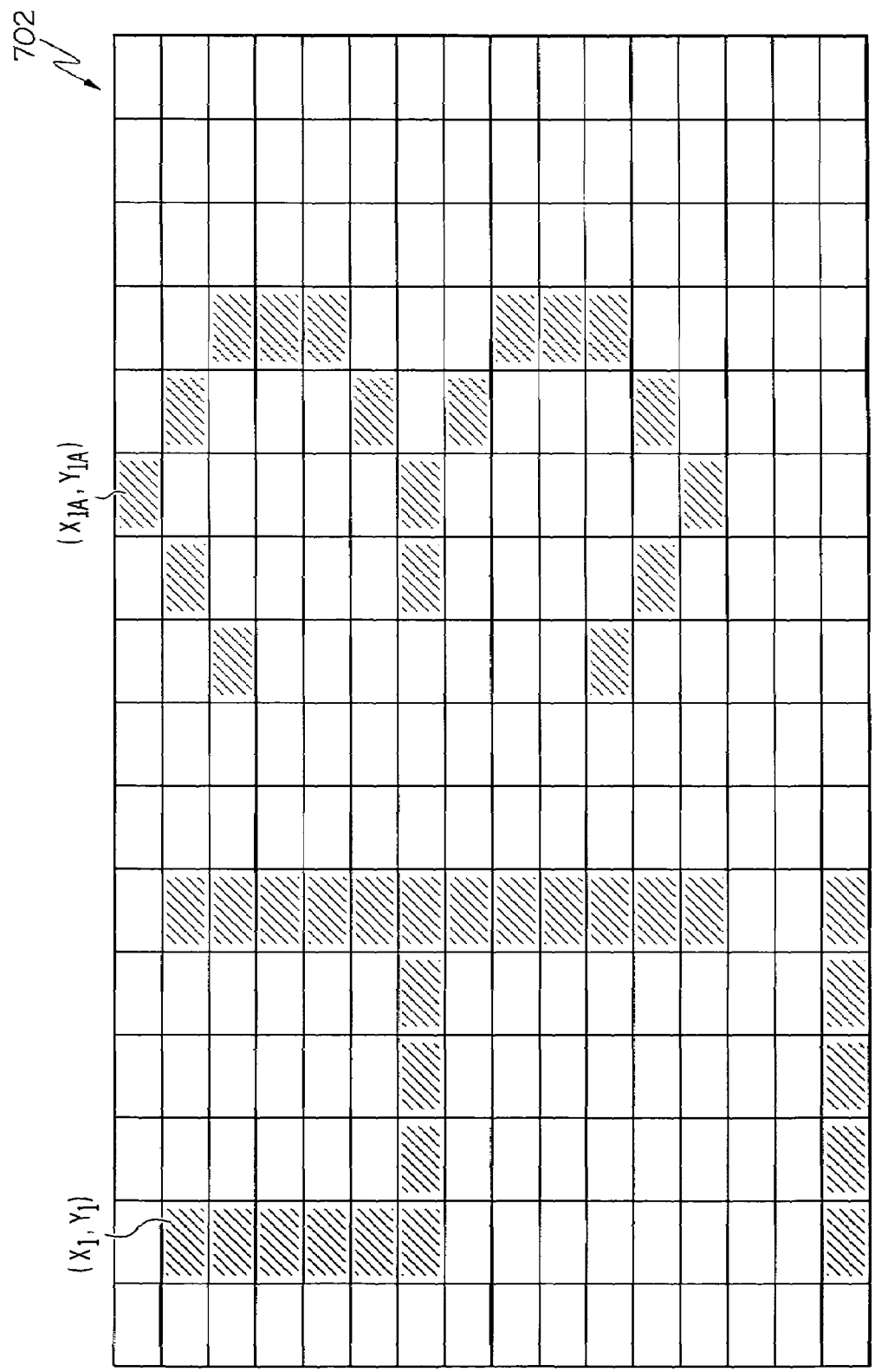
FIG. 7 illustrates an exemplary embodiment of a portion of a display showing marked critical symbology in accordance with the teachings of the present invention.
Figure 8:
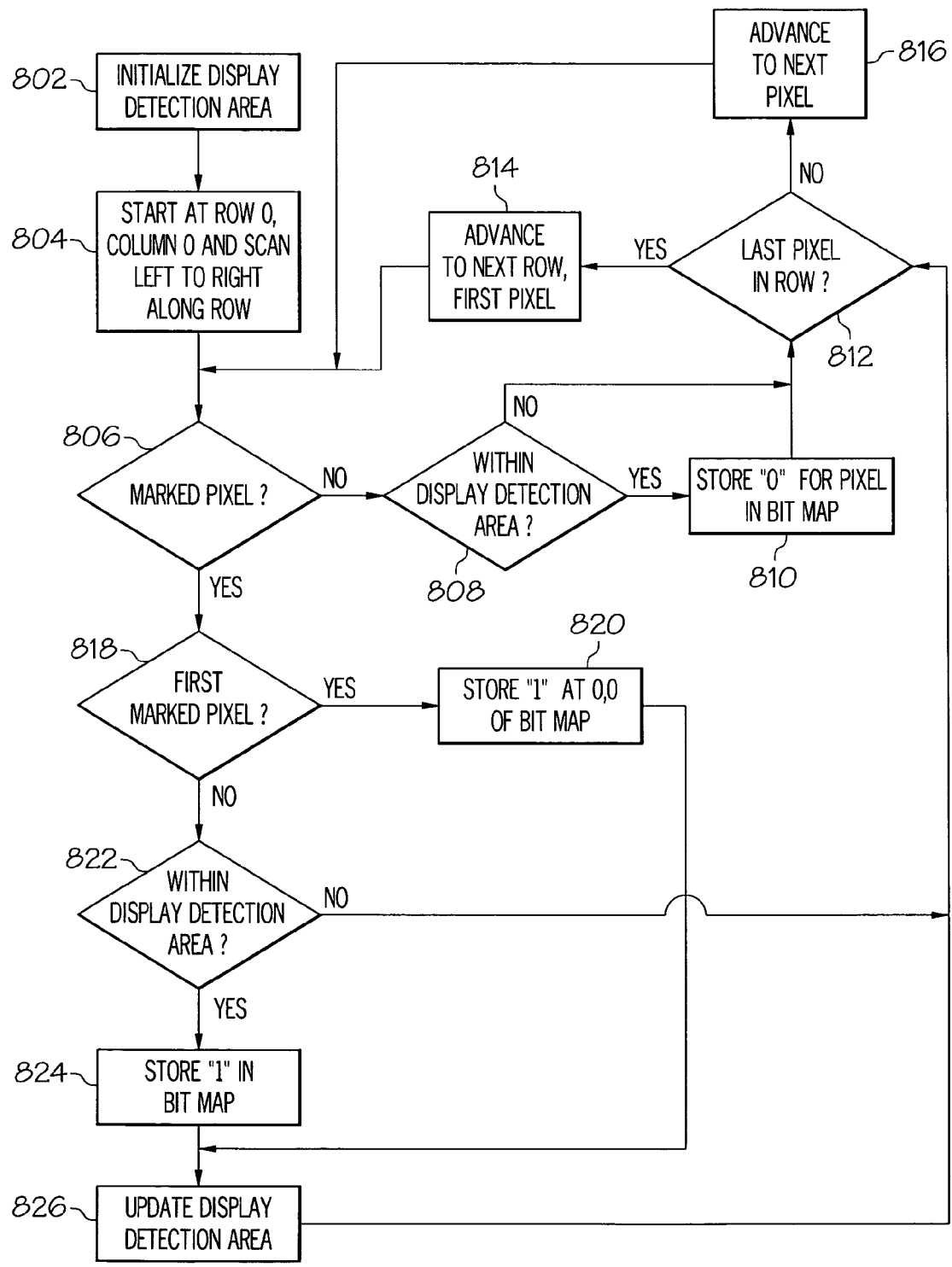
FIG. 8 is a flowchart of an exemplary method of locating critical symbology in a display and saving to a bit map in accordance with the teachings of the present invention.
Figure 9:
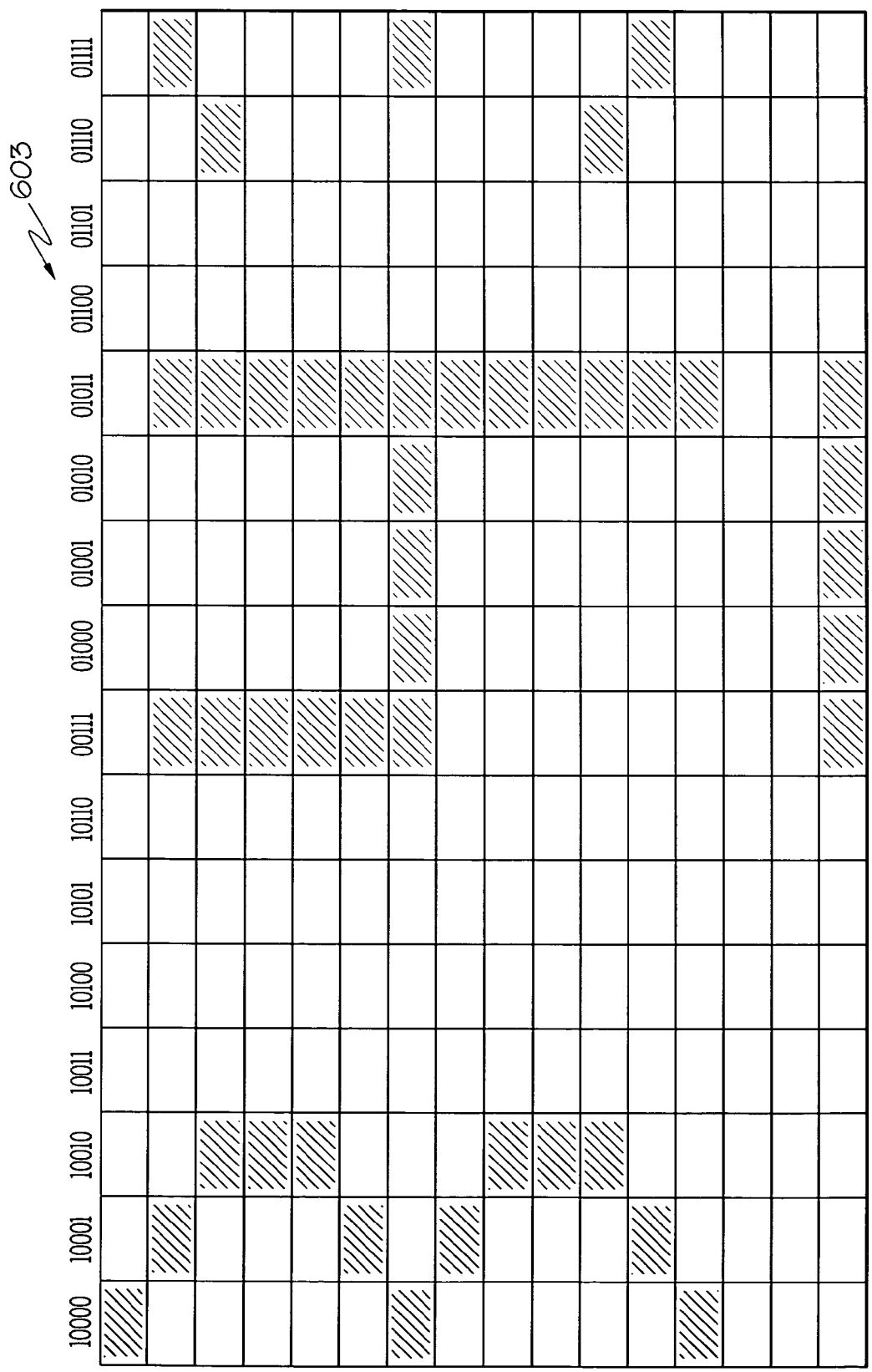
FIG. 9 is an exemplary bit map in accordance with the teachings of the present invention.

An exemplary embodiment of the detection of critical symbology and the use of the bit map 603 is shown in FIGS. 7-9. FIG. 7 illustrates a portion of the display that includes the critical symbology, which, in this exemplary embodiment, comprises the number "43" where the "4" is underlined. FIG. 8 is a flowchart of an exemplary embodiment for locating critical symbology in a display or a window of a display and populating the bit map 603 with the detected critical symbology, and FIG. 9 is an exemplary bit map produced by the monitor showing the critical symbology.

Turning to the flowchart of FIG. 8, in step 802 a display detection area is initialized. The display detection area is an area of the display that, if a marked pixel is detected within, a corresponding location in the bit map will be set. The display detection area sets forth, in one exemplary embodiment, a range of columns. The area can be set by two values setting an $X_{LOW}$ and $X_{HIGH}$ value as:

$$X_{LOW} = \text{Last}X - C$$

$$X_{HIGH} = \text{First}X + C$$

Where FirstX and LastX are values which can be adjusted to adjust the $X_{LOW}$ and $X_{HIGH}$ and C is based on the size of the bit map. The exemplary bit map of FIG. 9 is a 16×16 bit map and C will be set to the width of the bit map −1 or 15 in this case. FirstX and LastX are set using display coordinates. Initially, the FirstX and LastX can both be set to 0 producing $X_{LOW}=0$ (since there are no negative screen coordinate values the default is 0) and $X_{HIGH}=15$.

In step 804, the scanning process starts at the pixel at (0,0) of the display. In step 806, it is determined if the pixel is a marked pixel. If the pixel is not a marked pixel, in step 808 it is determined if the pixel is within the display detection area. If the pixel is not a marked pixel, but is within the display detection area, in step 810, a 0 is stored at a pixel in the bit map. If step 810 occurs before a marked pixel is found, in step 810 a 0 is always stored at position (0,0) of the bit map 603 (the location on the bit map 603 corresponding to the first row and first column).

After a 0 is stored in the bit map 603, it is determined if the pixel just checked was the last pixel in a row in step 812. If it is not the last pixel, in step 816 the process advances to the next pixel of the row.

If the pixel just checked is the last pixel in the row, the process advances to the first pixel of the next row, in step 814 and the process continues in step 806.

In step 808, if it is determined that the pixel just checked is not within the display detection area, the process continues at step 812 where it is determined if the pixel is the last pixel in the row. Then, either the next pixel in the row is checked via steps 816 and 806 or the first pixel in a new row is checked at steps 814 and 806.

Turning back to step 806, if it is determined that the pixel checked is a marked pixel, then, in step 818 it is determined if the marked pixel that was just located is the first marked pixel located.

If the pixel is the first located marked pixel, then, in step 820, a "1" is stored at location (0,0) of the bit map 603. Referring to FIG. 7, the first marked pixel that will be found is the top center of the "3", which is at screen position ($X_{1A}$, $Y_{1A}$).

In addition to setting location (0,0) of the bit map 603 of FIG. 9 to "1", in step 826, when the first pixel is detected, FirstX and LastX are both set to the horizontal screen coordinate of the first detected pixel, which in this case is $X_{1A}$. Therefore, $X_{LOW}=X_{1A}-15$ and $X_{HIGH}=X_{1A}+15$ in the exemplary embodiment of FIG. 7.

Also, a StartX variable is set to the horizontal screen position of the first detected pixel ($X_{1A}$ in this example) and a TopY variable is set to the vertical screen position of the first detected pixel ($Y_{1A}$ in this example). StartX and TopY are used to set the position of other locations in the bit map 603.

In step 818, if the marked pixel detected is not the first marked pixel, it is determined, in step 822, if the found marked pixel is within the display detection area. In FIG. 7, the next detected pixel will be the upper left part of the "4", which is located at the screen coordinate of ($X_1$, Y1). In this example $X_1$ is clearly within 15 pixels of $X_{1A}$ so the marked pixel is within the display detection area. Had the detected marked pixel not been within the display detection area, the process continues at step 812, as discussed previously.

In step 824, a "1" is stored in the bit map corresponding to the marked pixel. The location in the bit map where the "1" is stored is ($X_{CURRENT}$–StartX, $Y_{CURRENT}$–TopY) where $X_{CURRENT}$, $Y_{CURRENT}$ are the display screen coordinates of the current found marked pixel and, as discussed before StartX and TopY are the screen coordinates of the first detected pixel.

In FIG. 7, it can be seen that $X_1$ is nine pixels to the left of $X_{1A}$ and $Y_1$ is one pixel below $X_{1A}$. Thus, (X–StartX, Y–TopY) is (–9,1). Since negative numbers are not used in the bit map, the negative number indicates that to determine the columns to place the "1" in, the columns are counted to the left, wrapping around from the first column where the first detected pixel is located, to the last column and then to the left as needed. For the example above, nine pixels from the first detected pixel, the horizontal location of the pixel is at column 7 (0111 in binary) and the vertical location is at row 1 (one row down from the vertical location (row 0) of the first detected pixel).

After the pixel is stored in the bit map, in step 826, the display detection area is updated. If the horizontal pixel location value is less than FirstX and within LastX–C (where, in the exemplary embodiment of FIG. 9, C is 15). The value of FirstX is replaced by the horizontal pixel location value of the current marked pixel. If the horizontal pixel location value of the current marked pixel is greater than LastX and within FirstX+C (where C is 15 in the exemplary embodiment) then the value of LastX is set to the horizontal pixel location value of the current marked pixel. Since the pixels are scanned sequentially from left to right, FirstX will be updated first, which reduces the $X_{HIGH}$. When LastX is updated, $X_{LOW}$ will increase.

After step 826, the process continues at step 812 as discussed before. The process of scanning for marked pixels will continue until all pixels of a display area are scanned. The critical symbology of FIG. 7 will produce the bit map of FIG. 9.

One way to indicate a character is on the left hand side of the bit map 603 versus the right hand side, is to use a numerical column address that includes a bit indicating if the column is part of the right hand side of the bit map 603. For example, in FIG. 9, the bit map 603 is a 16 by 16 bit map. Thus, each column is addressed using a four bit binary number from 0000(0) to 1111(15). For columns that include the first detected pixel and for every pixel for each character detected to the right of that pixel, the address bit value can have a one ("1") appended to the front of the address bit. The columns storing pixels detected to the left of the first pixel can have a "0" appended to the front of the address bit (most significant bit). Thus, in FIG. 9, the first column address bit will be 10000 (column 0) while the number four starts at column 00111 (column 7). In one embodiment, by using the full five bits as the column value, the difference between the starting column for each character can be used to determine the original spacing of the character on the display. For example, the "3" starts at column 10000 or 16 and the "4" starts at column 00111 or 7. The difference is 9 columns which is the original column spacing in the display.

Figure 10:
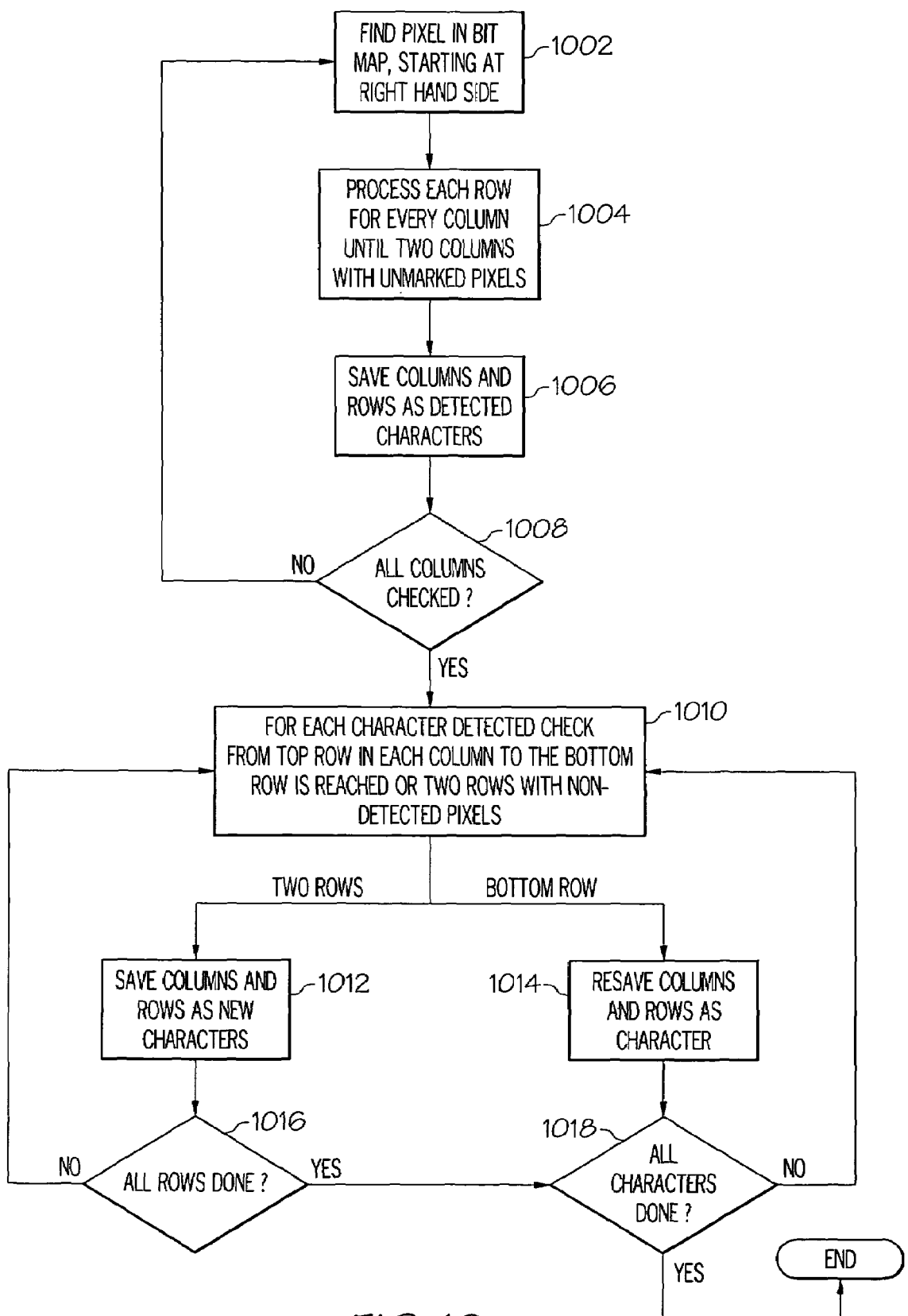
FIG. 10 is a flowchart illustrating an exemplary method for detecting and isolating characters in the bit map in accordance with the teachings of the present invention.

FIG. 10 is a flowchart illustrating an exemplary method for detecting and isolating characters in the bit map 603. In a first step, step 1002, the bit map 603 is searched to find marked pixels. In one embodiment, the pixels are searched from right to left, starting with the largest column from the left hand side of the bit map 603. As discussed previously, the columns on the left hand side can have a leading "1" as the most significant digit. Column 0 (0000) thus becomes, in this embodiment is 16 (10000). So, for FIG. 9 pixels will be scanned from right to left starting at column 22 (10110). Each pixel in the bit map 603 is examined to determine if the pixel is marked.

This continues in step 1004, for each column from right to left until no marked pixels are found in two consecutive columns. Then, in step 1006, the starting column with marked pixels, the starting row with marked pixels, the last row with marked pixels, and the last column with marked pixels are saved as the bounding box of the characters.

In step 1008, it is determined if all columns in the bit map 603 have been checked. If not all of the bit map 603 columns have been checked, then the process continues in step 1002. If all of the columns of the bit map have been checked, then in step 1010, for each character found, each row of the columns of the character is examined for marked pixels until either the bottom row of the character is reached or two consecutive rows are found that have no marked pixels.

If two consecutive rows without marked pixels are found, the left most column that includes a marked pixel, the right most column that includes a marked pixel, the top row having a marked pixel, and the bottom row having a marked pixel are stored as determining a new character bounding box in step 1012. Then, in step 1016, it is determined if all of the rows of that character have been examined. If not all of the rows for the selected characters have been examined, then the process continues in step 1010.

If all of the rows and columns of the character have been checked, in step 1018 it is determined if every character found has been examined. If every character has been examined, the process ends. If there are more characters to examine, the process continues at step 1010.

If, in step 1010, each row and column of the character is examined and the bottom row of the character is reached without finding two consecutive rows of unmarked pixels, the character's right column, left column, top row and bottom row are saved as the original character in step 1014. Then, in step 1018, it is determined if all characters have been examined. If all the characters have been examined, the process ends. If not, the process continues at step 1010. This method for locating individual characters works well when the characters are aligned into columns, however there are multiple other methods for locating the individual characters. For example a third sequence of steps similar to steps 1010-1018 could be added to the above method following a "Yes" to step 1018 that examines by columns and rows the characters saved in steps 1010-1018. By adding the third sequence of steps the method of locating individual characters will work well when the characters are not aligned into rows or columns, although it will be slower.

As an example, and with reference to FIG. 9, the bit map 603 is examined for marked pixels starting with any columns belonging to the left hand side of the bit map 603. In the example of FIG. 9, the column addresses to the left hand side begin with a "1". So, for FIG. 9, the first pixel found is the right pixel of the "3" at row 2, column 18. Then, moving from right to left, and wrapping around to the last column of the bit map to the first column, this is repeated for all columns and rows until there are at least two consecutive columns that have no marked bits. In this example, the "3" ends at column 14, so after column 13 and 12 are examined, the process stops. Then the starting column, column 18 (column 10010, using the most significant bit of "1" to represent the right hand side of the bit map 603), the ending column, column 14, the starting row, row 0, and the ending row, row 12, are stored as the location of the first character, the "3".

For the "4" and the underscore in the bit map 603 of FIG. 9, after step 1006, the starting column is column 11, the ending column is column 7, the first row is row 1, and the last row is row 15, since the underscore is included with the "4". This represents steps 1002-1006. After these steps, for the first character, the "3", each row of each character is checked for marked pixels until the bottom row of the original column is reached or there are two consecutive rows without a marked bit, which is step 1010. In the example of FIG. 9, for the "3", the bottom of the originally located character is reached. Thus, the coordinates for the character are the same as before and are resaved in step 1014.

For the "4" and underscore, in step 1010, after the bottom of the "4" is reached there are two blank rows. Thus, a new character is saved of left=column 7, right=column 11, top=row 1, and bottom=row 12. This is saved in step 1012. In step 1016, it is determined if all the rows of the character detected in steps 1002-1008 have been checked. In FIG. 9, there is one more row to check, which is row 15. In row 15, the underscore is then checked in step 1010. In step 1014, the coordinates can be saved, which is row 15, columns 7-11.

In one embodiment, the coordinate value of the top, right bit map location, a delta x value representing the width of the bounding box of the characters, and a delta y value representing the height of the bounding box of the characters can be saved and later sent as the location of the character.

Figure 11:
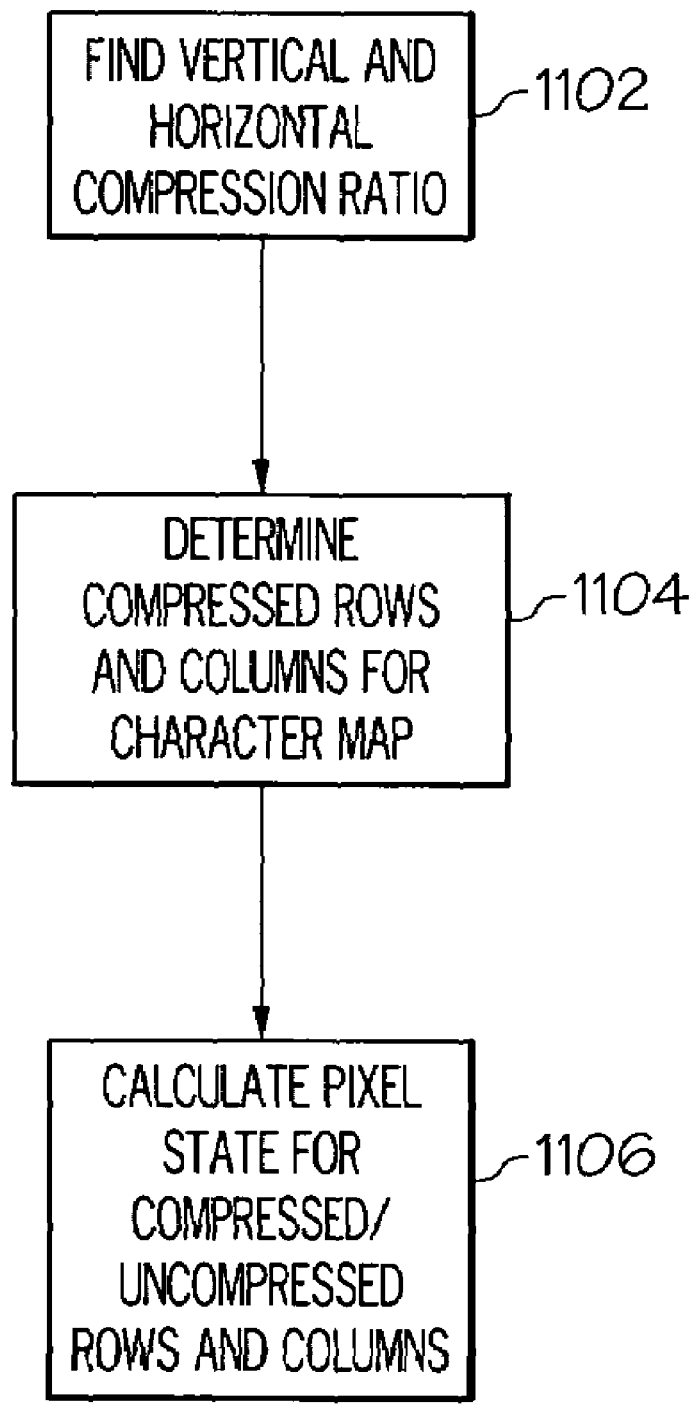
FIG. 11 is a flowchart illustrating an exemplary method for taking characters saved in the bit map and decreasing them in size to allow for sending to the monitor warning function device in accordance with the teachings of the present invention.

FIG. 11 is a flowchart illustrating a method for taking characters saved in the bit map 603 and decreasing them in size to allow for sending to the monitor warning function device 110. In one exemplary embodiment, all characters in the bit map 603 are rewritten into an 8 by 8 character map. Other sizes of the character map can also be used and the character map does not have to be square (for example 7×9 also fits in 64-bits). This both decreases the resources needed to send the data and standardizes the size of the alphanumerical characters for conversion and correlation to template characters, or other character comparison structures.

In a first step, step 1102, horizontal and vertical compression ratios are calculated based on the following equations:

$$\text{Vertical Compression Ratio} = \frac{\text{Number of pixels in the character's length}}{\text{Vertical size of character map}}$$

$$\text{Horizontal Compression Ratio} = \frac{\text{Number of pixels in the character's width}}{\text{Horizontal size of character map}}$$

The vertical size of the character map in this example is 8 pixels, the equation is:

$$\text{Vertical Compression Ratio} = \frac{\text{Number of pixels in the character's length}}{8 \text{ pixels}}$$

The horizontal compression is, therefore:

$$\text{Horizontal Compression Ratio} = \frac{\text{Number of pixels in the character's width}}{8 \text{ pixels}}$$

For all compression ratios, if the ratio is below 1, the compression ratio is set at 1.

Next, in step 1104, it is determined how many compressed rows and/or columns are needed along with how many non-compressed rows and columns are required to map from the bit map to the 8 by 8 character map. For example, if the compression ratio is two to one in the vertical direction, a character 16 pixels tall would need to be compressed to 8 pixels. This requires every two rows in the original bit map 603 to be compressed to one row in the character map.

In step 1106, for each compression row or column, all of the bit values for each bit comprising the compressed rows or columns are ORed to determine the bit value for each pixel in the character rows and/or columns. In step 1108, for non-compressed rows and columns, the bit values transfer from the bit map 603 to the character map.

As an example of the method in FIG. 11, consider the character "4" in FIG. 9. The character is five pixels wide (the character extends across five columns) and is twelve pixels long (the character extends down twelve rows). Therefore, the compression ratios can be calculated:

$$\text{Vertical Compression Ratio} = \frac{12 \text{ pixels}}{8 \text{ pixels}} = 1.5$$

$$\text{Horizontal Compression Ratio} = \frac{5 \text{ pixels}}{8 \text{ pixels}} = 0.625$$

Since any compression ratio less than 1 is set at 1, the horizontal compression ratio is set at 1, or no compression.

Figure 12:
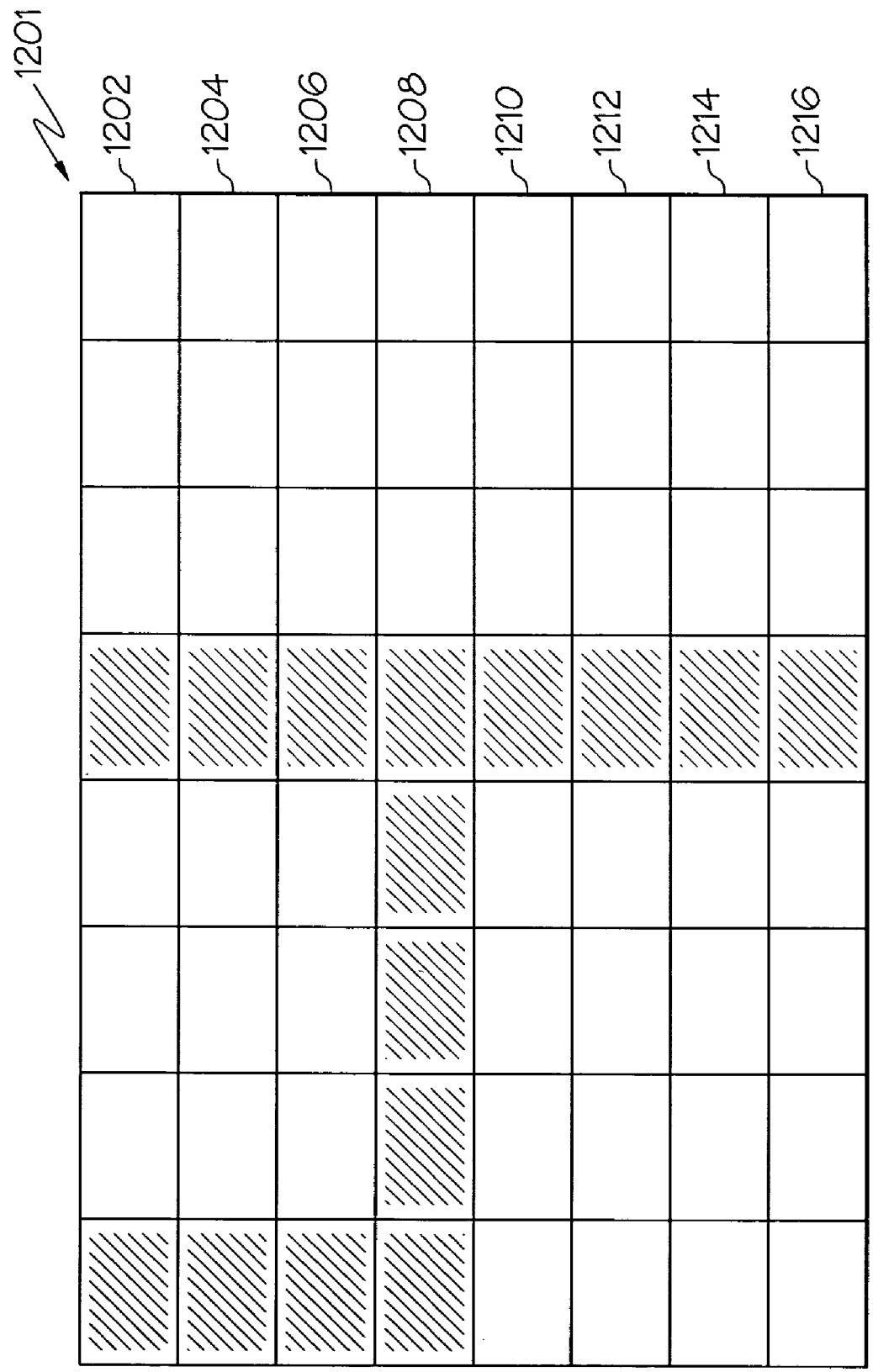
FIG. 12 is an exemplary embodiment of a character map in accordance with the teachings of the present invention.

In the vertical direction the compression ration is 1.5. Thus, if two rows are compressed for every one row that is not compressed, the twelve pixels tall "4" can be compressed to eight pixels tall. Thus, the first two rows of the character (row 1 and row 2) are compressed to form a first row 1202 of an 8×8 character map 1201 as illustrated in FIG. 12. In this case, the result is a marked pixel in the first row, first column and the first row, fourth column.

The next row of the character in the bit map 603, row 3, is not compressed and is used as a second row 1204 of the 8×8 character map 1201. The fourth and fifth row of the character are compressed by ORing the pixels of the two rows together to form the third row 1206 of the 8×8 character map 1201. Then, the sixth row of the "4" character in the bit map 603 is used as a fourth row 1208 of the 8×8 character map 1201. This process continues for rows 1210-1216 until the 8×8 character map 1201 is filled.

After all of the characters of the critical symbology are detected, isolated and mapped to a character map, data concerning the detected characters can be sent to the monitor warning function device 110 via, in one exemplary embodiment, the display processor 102. This data can include the bit pattern of each character map for each character, as well as pixel location values to determine the original location of the pixels on the display screen. This information can then be used for comparison purposes with character templates, characters generated by the monitor warning function device 110 or other comparison structures. Multiple compression algorithms can be employed beyond the one presented in this embodiment including no-compression or character pattern matching with correlation to just report the character code.

The above flowchart discusses the marking, detection and processing of critical symbology assuming the alphanumeric characters are regular (bright) characters on a background (such as a red character on a white background). For example, the critical symbology for a line of alphanumeric characters may be bright characters on any background (such as a black background). In this case, the least significant bit of the critical symbology can be set to "1" and all the background pixels have the least significant bit set to "0". However, certain characters shown in a white or other bright background are known as reverse characters. In reverse characters, the character is not formed by pixels but instead is formed by pixels outlining the character. For example, a black "H" on a white background would appear as an area of white pixels with a number of dark pixels forming the "H" character. The difficulty in this embodiment is that since the center pixels of the character can be black, the least significant bit of a color value can not be forced to "1". In this case, the reverse profile of FIG. 3 is cut into the bright background, resulting in the darkest pixels at the center 404 of the line 402.

Therefore, a slightly different approach is required to handle reverse characters. If critical symbology is to be displayed as a reverse character, when the rendering engine 204 is rendering pixels, instead of marking the pixels of the critical symbology, the pixels surrounding the critical symbology are marked as discussed previously. Then, when the pixels are being processed in the graphics logic device 106, any character pixel surrounded by an area of marked pixels is detected and a corresponding bit in the bit map is set to represent that bit. In one exemplary embodiment, the intensity value of the pixel must be below a threshold value as explained in conjunction with FIG. 3 and FIG. 4.

Additionally, in an exemplary embodiment, a video stream may display on a display unit 108 or in one display window of the display unit 108. As discussed previously, the video can be video from a video camera mounted on the airplane and showing a component of the airplane such as the position of the landing gear. Critical symbology may also be merged with the video after the rendering of the pixels by rendering engine 204. When this occurs, the video pixels can have least significant bits set to "1" since the pixels of the video were not processed by the rendering engine 204. Thus, if the graphics logic device 106 only attempts to locate marked bits, the merged video stream can make the detection of marked bits of critical symbology impossible.

To alleviate this problem, the integrity monitoring function 502 of the graphics logic device 106 not only looks for marked bits, but also looks for pixels having an intensity value above a certain intensity threshold. Recall that the present invention marks the center pixels of the critical symbology, which has the highest intensity value. By holding the intensity value of the video stream below the intensity value of the marked pixels, the integrity monitoring function 502 of the graphics logic device 106 will locate the marked bits of the critical symbology. Marking only the center most pixels of a line makes the detection more accurate and avoids excessive character bits which would make compression problems since a great many pixels will be sent.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method for verifying the rendering of an image for a display system comprising:
   receiving a plurality of modified pixels of the image, each modified pixel marked to identify a critical symbology within the image;
   receiving a location of each of the marked pixels of the critical symbology;
   storing each of the modified pixels and the location of each of the modified pixels in a memory;
   scanning the memory;
   detecting a first marked pixel and its location in the image during the scan;
   saving the first detected marked pixel to a bitmap as a reference pixel;
   determining which remaining marked pixels from the image are located right or left of the first detected marked pixel in the image; and
   saving each remaining marked pixels to the bitmap on an opposite side of the reference pixel relative to its location in the image.

2. The method of claim 1 further comprising the steps of:
   transferring the bitmap of the critical symbology to a monitor warning function device; and
   verifying the generation of the critical symbology using the transferred data against a comparison data structure.

3. The method of claim 2 wherein the transferring step further comprises the steps of transferring the marked pixel location, a size of an alphanumeric critical symbology and a representation of the alphanumeric critical symbology to a monitor warning function device.

4. The method of claim 3 further comprising matching the representation of the alphanumeric critical symbology to a template of the character to verify the generation of the alphanumeric critical symbology.

5. The method of claim 1 further comprising the step of selecting the critical symbology prior to the step of generating a plurality of pixels that form the image.

6. The method of claim 1 wherein the step of modifying the pixels further comprises setting the least significant bit of at least one color value of the pixels for all of the pixels that comprise the critical symbology to a "1" value and setting the least significant bit of at least one color value of the pixels for all other pixels in the image to a "0" value.

7. The method of claim 6 wherein the step of modifying the pixels further comprises marking the pixels of the critical symbology that exceed an intensity threshold.

8. The method of claim 7 further comprising:
merging a video feed with the plurality of pixels that form the image;
limiting an intensity of the video fed below a threshold; and
detecting the critical symbology by detecting marked pixels within the video feed having the intensity value above the threshold.

9. The method of claim 1 further comprising:
setting a character string as the critical symbology;
locating the character string in the plurality of pixels that form the image;
saving the character string to the bit map;
isolating individual characters of the character string in the bit map; and
mapping each isolated character from the bit map to a character map.

10. The method of claim 9 further comprising the step of calculating a correlation between the character map and a template to verify accurate generation of the critical symbology.

11. The method of claim 1 further comprising:
generating a section of the image having reverse characters as the critical symbology; and
modifying at least part of the critical symbology by setting the least significant bit of all of the reverse characters to a "0" value and setting background pixels around the critical symbology to a "1" value.

12. A method for verifying the rendering of an image for a display system comprising:
generating a plurality of pixels that form the image;
modifying pixels to produce marked pixels of a critical symbology within the image;
sending the plurality of pixels to an integrity monitoring function;
retrieving the marked pixels of the critical symbology and a location of the marked pixels of the critical symbology for use to verify the rendering of a graphic image at the integrity monitoring function;
saving data representative of the critical symbology derived from the marked pixels of the critical symbology and the location of the marked pixels of the critical symbology to a memory;
transferring the location of a first end pixel, a second end pixel, a midpoint pixel, a one-fourth pixel located between the first end pixel and the midpoint pixel, and a three-fourth pixel located between the second end pixel and the midpoint pixel of a graphical critical symbology to a monitor warning function device; and
verifying the generation of the critical symbology using the transferred data.

13. A system for verifying the generation of a critical symbology comprising:
a display processor configured to generate graphic commands from one or more system inputs, the display processor further configured to determine the critical symbology;
a graphics processing unit coupled to the display processor, the graphics processing unit configured to generate a plurality of pixels forming an image, the graphics processing unit further configured to modify at least a portion of the plurality of pixels to produce marked pixels of the critical symbology;
a graphics logic device coupled to the graphics processing unit, the graphics logic device comprising:
an integrity monitoring function configured to detect the marked pixels and generate data regarding the critical symbology, the integrity monitoring function configured to:
receive a plurality of modified pixels of the image that are marked to identify a critical symbology within the image,
receive a location of each of the marked pixels of the critical symbology,
send each of the modified pixels and the location of each of the modified pixels to a memory,
scan the memory,
detect a first marked pixel and its location in the image during the scan,
save the first detected marked pixel to a bitmap as a reference pixel,
determine which of the remaining marked pixels from the image are located to the right or to the left of the first detected marked pixel in the image, and
save each remaining marked pixels to the bitmap on an opposite side of the reference pixel relative to its location in the image;
a memory coupled to the integrity monitoring function, the memory configured to store the data regarding the critical symbology; and
a monitor warning function device coupled to the graphics logic device, the monitor warning function device configured to receive the data regarding the critical symbology and verify the generation of the critical symbology.

14. The system of claim 13 wherein the graphics logic device is further configured to transfer a pixel location and a size of an alphanumeric critical symbology and a representation of the alphanumeric critical symbology to the monitor warning function device.

15. The system of claim 13 wherein the graphics processing unit is further configured to modify the least significant bit of at least one color value of all of the marked pixels of the critical symbology to a "1" value and set the least significant bit of at least one color value of the plurality of pixels for all other pixels in the image to a "0" value.

16. The system of claim 13 wherein the graphics logic device is further configured to:
locate a character string comprising the critical symbology in the plurality of pixels forming the image;
save the character string to a bit map;
isolate individual characters of the character string in the bit map; and
map each isolated character from the bit map to a character map.

17. The system of claim 13 wherein the graphics processing unit is further configured to merge a video feed with the plurality of pixels that form the image to produce a merged video feed, and the graphics logic device is further configured to detect the critical symbology within the merged video feed and the plurality of pixels by detecting marked pixels having an intensity value above a threshold.

18. A system for verifying the generation of a critical symbology comprising:

a display processor configured to generate graphic commands from one or more system inputs, the display processor further configured to determine the critical symbology;

a graphics processing unit, coupled to the display processor, the graphics processing unit configured to generate a plurality of pixels forming an image, the graphics processing unit further configured to modify at least a portion of the plurality of pixels to produce marked pixels of the critical symbology, a graphics logic device coupled to the graphics processing unit, the graphics logic device comprising:
an integrity monitoring function configured to detect the marked pixels and generate data regarding the critical symbology, the data regarding the critical symbology comprising a first end pixel, a second end pixel, a midpoint pixel, a one-fourth pixel located between the first end pixel and the midpoint pixel, and a three-fourth pixel located between the second end pixel and the midpoint pixel of a graphical critical symbology;
a memory coupled to the integrity monitoring function, the memory configured to store the data regarding the critical symbology; and a monitor warning function device coupled to the graphics logic device, the monitor warning function device being configured to receive the data regarding the critical symbology and verify the generation of the critical symbology, the graphic logic device being configured to transfer the data to the monitor warning function device.

19. A system for verifying the generation of a critical symbology comprising:

a display processor configured to generate graphic commands from one or more system inputs, the display processor further configured to determine the critical symbology;

a graphics processing unit, coupled to the display processor, the graphics processing unit configured to generate a plurality of pixels forming an image, the graphics processing unit further configured to modify at least a portion of the plurality of pixels to produce marked pixels of the critical symbology;

a graphics logic device coupled to the graphics processing unit, the graphics logic device comprising:
an integrity monitoring function configured to:
locate a first marked pixel in the image,
store a "1" at an initial location of a bitmap representing the first marked pixel, the bitmap being other than the image,
sequentially locate additional marked pixels in the image,
determine which of the additional marked pixels in the image are located to the right or to the left of the first marked pixel in the image, and
store a "1" in the bit map for each remaining marked pixel located on an opposite side of the first marked pixel relative to its location in the image, the "1" placement in the bitmap based on the "1" stored at the initial location and a offset between the first marked and the located marked pixel;
a memory coupled to the integrity monitoring function, the memory configured to store the data regarding the critical symbology; and a monitor warning function device coupled to the graphics logic device, the monitor warning function device configured to receive the data regarding the critical symbology and verify the generation of the critical symbology.

20. The system of claim 19 wherein the integrity monitoring function is further configured to isolate individual characters from the bitmap.

* * * * *